July 20, 1954   F. L. ZION   2,683,922
METHOD OF MAKING CLAMPING RINGS
Filed Jan. 14, 1952

INVENTOR.
FOREST L. ZION
BY
Willits, Hardman & Fehr
HIS ATTORNEYS

Patented July 20, 1954

2,683,922

UNITED STATES PATENT OFFICE 2,683,922

METHOD OF MAKING CLAMPING RINGS

Forest L. Zion, Anderson, Ind., assignor to General Motors Corporation, Detroit, Mich., a corporation of Delaware Application January 14, 1952, Serial No. 266,380

1 Claim. (Cl. 29—156)

This invention relates to an article of manufacture and to a new method for making such an article, and more particularly to metal clamping rings for use with commutators and to a method of making the clamping ring.

The prime objects of the present invention are therefore to provide a new and improved clamping ring and a method of forming a clamping ring including a V-shaped portion.

In carrying out the above object, it is a further object to provide a method forming a clamping ring of the character described from bar stock. This is accomplished by providing a length of round or rectangular shaped bars of metal, such as steel, winding the length of said stock upon a mandrel into a circular member, severing the stock longitudinally of the mandrel to provide a plurality of circular members, and then coining the circular member into a smooth surface ring of the desired shape.

Heretofore it has been the practice to blank continuous rings from sheet metal. It is apparent that such procedure is relatively expensive on account of time required and the amount of material wasted, due to the fact that metal surrounding the outer periphery of the ring and the metal blanked from the center thereof is all scrap. The present invention is directed to means for reducing scrap and thereby reducing the cost of clamping rings.

Further objects and advantages of the present invention will be apparent from the following description, reference being had to the accompanying drawings wherein preferred embodiments of the present invention are clearly shown.

Figure 1:
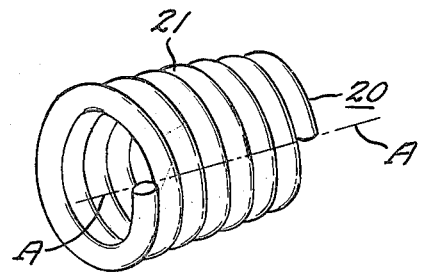
Fig. 1 shows a length of rounded stock after it has been wound upon a mandrel.

Referring to Fig. 1 length of rounded stock 20 is wound spirally upon a mandrel, not shown. If desired the stock could be rectangular in shape with rounded edges. The mandrel upon which the stock is wound has a diameter equal to, or slightly less than, the desired inner diameter of a finished clamping ring. When the length of stock is wound on the mandrel to form the spiral 21 as shown in Fig. 1 each intermediate coil is in contact with a coil on either side thereof. After the length of stock is wound on the mandrel the spiral is then cut longitudinally along line A—A to provide a plurality of rings 22 shown in Fig. 2. The ends 23 and 24 are offset the width of the stock 20 which is the helix angle of the spiral 21. If desired, a length of stock of shorter length could be used and wound in a ring so that the ends 23 and 24 are aligned and abut each other indicated by the dotted lines shown in Fig. 2.

Figure 3:
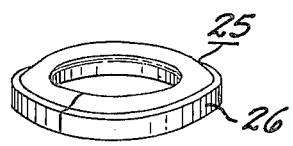
Fig. 3 is a perspective view of a ring showing the general appearance of the complete article formed from round stock shown in Fig. 1.
Figure 8:
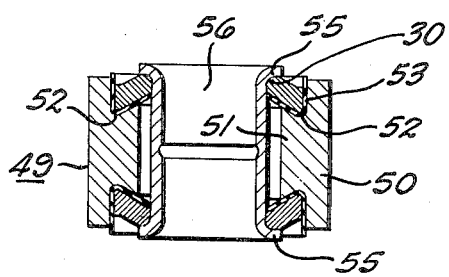
Fig. 8 is a sectional view of a commutator illustrating the use of the clamping ring shown in Fig. 4.
Figure 4:
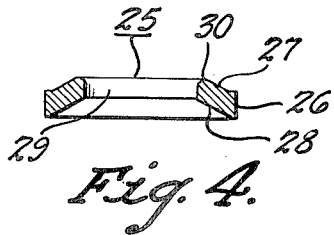
Fig. 4 is a cross sectional view of ring shown in Fig. 3.

After the rings 22 are severed from the spiral 21 the next step is to place a single ring 22 in suitable forming dies, not shown. If desired the ring of round stock may be deformed to provide a ring that is substantially rectangular in cross dimension before it is placed in the dies. While the ring is being deformed by the dies the metal is caused to cold flow in all directions against the die surfaces and a pilot to change the cross-dimensions of the ring shown in Fig. 2 to a wedge-shaped clamping ring 25 shown in Figs. 3 and 4. In this instance the ring 25 has a smooth slightly tapered outer peripheral surface 26, conical surfaces 27 and 28 and a cylindrical surface 29. The conical surface 27 is joined to a cylindrical surface by a rounded surface 30 the purpose of which will be more apparent hereinafter. The surfaces 30 could be chamfered if so desired.

Figure 5:
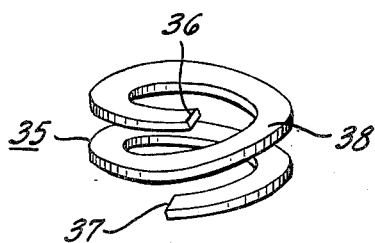
Fig. 5 is a perspective view of circular member formed from flat stock of metal.
Figure 6:
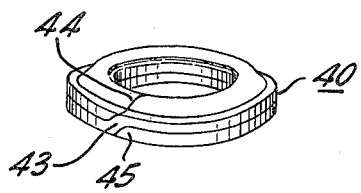
Fig. 6 is a perspective view of a modified form of a clamping ring showing the general appearance of the complete article made from the stock shown in Fig. 5.

A modification of the stock used in making the clamping ring is shown in Fig. 5. In this instance a non-rounded or rectangular-shaped stock is used instead of round stock. It is to be understood that the corners of this stock can be rounded and that other suitable shaped stock may be used. When rectangular stock is used a length of this stock is wound on a mandrel in the same manner as set forth for the round stock. After the rectangular stock is wound on the mandrel to form a long spiral coil, the spiral is cut longitudinally. In this instance only alternate coils are severed to provide a plurality of circular members 35 as shown in Fig. 5. The ends 36 and 37 are offset in a plane perpendicular to the axis and are spaced from each other by an intermediate coil 38. While the modification of the invention is particularly useful in making wedge-shaped rings having only one coil between the ends, it is to be understood, of course, that it is not limited to one coil or any numbers of coils between the ends. After the circular members 35 are severed from the long spiral a single circular member is placed in suitable dies to form an offset 43. Then the circular member is placed in suitable dies to form a wedge shape clamping ring 40 which is similar in cross dimension to ring 25. When the spiral circular member 35 is coined into the edge shaped clamping member 40 it has an upper wall 41, and lower wall 42 and an offset 43 disposed between the adjacent ends 36 and 37. When the member 35 is being deformed or coined the metal adjacent the ends 36 and 37 is caused to cold flow against the offset portion 43 in order to avoid sharp flash of metal that will cut insulation, the edges being shown in the completed ring 40 at 44 and 45, Fig. 6. The clamping rings thus formed may be used in clamping annulus of insulated segments of a commutator 49.

The commutator 49 to which either one of the finished wedge-shaped rings 25 or 40 may be used, comprises an annular ring of insulated bars 50. Each bar is provided with a dovetail portion 51 so that the annulus of bars provides annular V-shaped grooves 52 at each end of the annulus. The V-grooves 52 are lined with rings and insulating material 53, such as glass cloth, mica or other suitable insulating material and each V-groove 52 receives one of the wedge shaped rings 25 or 40. The annulus of commutator bars are clamped between the wedge-shaped or V-shaped rings and the rings are secured in position by flaring the ends 55 of a tube 56 over the rounded surface 30 and against the outer smooth surface 27 of the V-rings.

Figure 2:
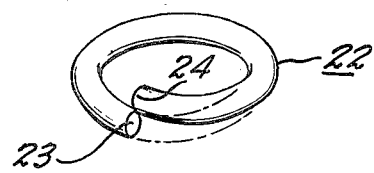
Fig. 2 shows a perspective view of a single ring before it is coined.
Figure 7:
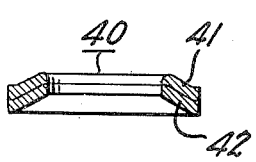
Fig. 7 is a cross sectional view of the ring shown in Fig. 6.

The method disclosed herein includes operations upon a length of round or rectangular stock. The first step in the process is to provide a length of stock. The second step in the process is to coil the stock on a mandrel into a long spiral 21. The third step in the process is to cut the spiral so as to provide a plurality of rings 22 or circular members 35, of a spiral nature having the two ends thereof offset as shown in Figs. 2 and 5. The final operation in the process is to place a single ring or circular member in suitable dies to deform or coin the ring or circular member. The dies cause the metal to cold flow against all surfaces forming the die members so that the round stock or the rectangular stock, which form the ring or the circular member has been changed to an annular member wedge-shaped in cross section.

One of the important advantages of the present invention is that the amount of waste of the clamping rings metal has been reduced to the minimum. It is apparent from the foregoing of the manufacture of clamping rings that the cost of manufacture has been greatly reduced. This is due to the great saving of material as compared with the material involved in the manufacture of clamping rings which are blanked from sheets of flat stock.

While the embodiments of the present invention as herein disclosed, constitute a preferred form, it is to be understood that other forms might be adopted.

What is claimed is as follows:

A method of making an annular ring comprising the steps, providing a piece of elongated metal stock of rectangular cross sectional shape; winding the elongate piece of metal stock upon a mandrel of the desired dimension so that each adjacent turn of the piece of metal stock is in contact with the next turn thereof; severing alternate turns of the stock of the mandrel for forming a plurality of two convolution split circular members with the severed ends in substantially axial alignment; collapsing each circular member until the contiguous surfaces contact each other and simultaneously coining the circular member until the contiguous surfaces are in tight engagement to form a continuous smooth surface on all sides and a plural plywall structure and to change the cross sectional shape of the member so that at least the inner side of the member will be conical.

References Cited in the file of this patent

UNITED STATES PATENTS

| Number | Name | Date |
|---|---|---|
| 254,559 | Lothrop | Mar. 7, 1882 |
| 327,743 | Uren | Oct. 6, 1885 |
| 370,832 | Upham | Oct. 4, 1887 |
| 373,515 | Byrne | Nov. 22, 1887 |
| 389,144 | Gothman | Sept. 4, 1888 |
| 432,365 | Bowden | July 15, 1890 |
| 473,943 | Meneely | May 3, 1892 |
| 879,925 | Taylor | Feb. 25, 1908 |
| 1,377,266 | Mossberg | May 10, 1921 |
| 2,566,448 | Heintz | Sept. 4, 1951 |

FOREIGN PATENTS

| Number | Country | Date |
|---|---|---|
| 434,495 | Germany | Sept. 23, 1926 |
| 379,285 | Italy | Mar. 20, 1940 |